United States Patent
Gross et al.

[11] Patent Number: 5,877,960
[45] Date of Patent: Mar. 2, 1999

[54] METHOD AND APPARATUS FOR MONITORING AND POSITIONING A BEAM OR JET FOR OPERATING ON A WORKPIECE

[75] Inventors: Norbert Gross, Pfungen, Switzerland; Heinz P. Helm, Weikersheim, Germany

[73] Assignee: Elpatronic AG, Bergdietikon, Switzerland

[21] Appl. No.: 706,403

[22] Filed: Aug. 29, 1996

[30] Foreign Application Priority Data

Oct. 6, 1995 [CH] Switzerland ................ 2823/95

[51] Int. Cl.[6] ................ G06F 19/00; B23K 26/00
[52] U.S. Cl. ................ 364/474.17; 364/474.3; 364/474.35; 364/474.37; 364/474.08; 364/477.06; 219/121.13; 219/121.63; 219/121.78
[58] Field of Search .............. 364/474.16, 474.17, 364/474.18, 474.3, 474.35, 474.37, 477.06, 472.04, 474.08, 477.01; 219/121.12, 121.13, 121.18, 121.23, 121.6, 121.7, 121.78, 121.79, 121.8; 318/576, 577

[56] References Cited

U.S. PATENT DOCUMENTS

| | | | |
|---|---|---|---|
| 4,199,674 | 4/1980 | Keser et al. | 219/124.34 |
| 4,571,479 | 2/1986 | Maeda et al. | 219/124.34 |
| 4,588,872 | 5/1986 | Bollinger et al. | 219/124.34 |
| 4,827,099 | 5/1989 | Krebs et al. | 219/121.63 |
| 4,831,233 | 5/1989 | Gordon | 219/124.34 |
| 4,843,287 | 6/1989 | Taft | 318/568.16 |
| 4,907,169 | 3/1990 | Lovoi | 219/124.34 |
| 4,916,286 | 4/1990 | Sarugaku et al. | 219/124.34 |
| 4,924,063 | 5/1990 | Büchel et al. | 219/121.78 |

FOREIGN PATENT DOCUMENTS

| | | |
|---|---|---|
| 2608720 | 3/1976 | Germany . |
| 3801626 | 1/1988 | Germany . |
| 43 12 241 A1 | 10/1994 | Germany . |
| 56-122673 | 9/1981 | Japan . |
| 58-107273 | 6/1983 | Japan . |
| 62-114787 | 5/1987 | Japan . |
| 5293648 | 9/1993 | Japan . |

*Primary Examiner*—Paul P. Gordon
*Attorney, Agent, or Firm*—McCormick, Paulding & Huber

[57] ABSTRACT

In a method for monitoring and positioning a beam or jet for operating on a workpiece, a first sensor (eg. in the case of a beam, a seam detecting system) ahead of the beam or jet, and/or a preset value, determines the path to be followed by the beam or jet. A second sensor behind the beam or jet monitors the action of the beam or jet. The preset value, or the readings obtained by the first sensor regarding a required position of the beam or jet, is or are compared with readings obtained by the second sensor regarding an actual position of the beam or jet, taking account of the velocity-dependent relative displacement between the beam or jet and the workpiece. The beam or jet is corrected to a basic position if the actual position deviates from the required position.

3 Claims, 1 Drawing Sheet

METHOD AND APPARATUS FOR MONITORING AND POSITIONING A BEAM OR JET FOR OPERATING ON A WORKPIECE

BACKGROUND OF THE INVENTION

The invention relates to a method for monitoring and positioning a beam or jet for operating on a workpiece, in which a first sensor (for example, of a seam detecting system in the case of a beam) ahead of the beam or jet, and/or a preset value, determine(s) the path to be followed by the beam or jet, and a second sensor behind the beam or jet monitors the action of the beam or jet. The invention also relates to an apparatus for carrying out the method.

In a large number of primarily industrial, machining processes a beam or jet has to be monitored and/or positioned. This is true in laser beam cutting or water jet cutting, for example. In both cases, the path of the beam or jet is predetermined, usually by an electronic system. The beam or jet then has to follow this path. Cutting quality depends upon (among other factors) the precise adherence of the beam or jet to the predetermined route.

To an even greater extent the same is true in welding with a beam, and especially in laser beam welding. Again, the very advantages of sheet-metal parts mass-produced by butt welding by the laser beam process (eg. those known in the motor vehicle industry as "tailored blanks") cannot be fully exploited unless the exacting requirements of this process, in terms of geometrical tolerances of components, quality of cut edges, and characteristics of the laser radiation, are met.

With a normal focus diameter of 0.2 to 0.4 mm, exact positioning of the laser beam on a joint line between the two workpieces to be joined together is essential in order for a high-quality welded joint to be obtained. For a technical "nil" gap, the maximum position tolerance should not exceed 0.1 mm. Moreover, where gaps have to be bridged by the molten pool, this tolerance must be further reduced.

Lack of fusion due to poor beam positioning is particularly critical in welds with only partial penetration, being concealed by the wider upper run of weld. Even in welds with full penetration, a slightly widened seam root may result in invisible internal lack of fusion.

Sufficiently high positioning accuracies are obtained nowadays by means of optoelectronic sensors or image processing systems which transmit the actual track of the joint line, ie. the track of the abutting edges of the workpieces, ahead of the beam, directly to the machine control system as a series of correction coordinates. By these means, a laser head can be orientated with respect to the seam with accuracies of approximately 0.05 mm. A seam detecting system of this kind is disclosed for example in DE-OS 4312241.

A fundamental drawback of these methods lies in the fact that the joint line detection systems have to start out from a fixed preset laser beam position. Measured position coordinates cannot be referenced to the actual position of the beam. This is partly remedied by carrying out a calibration procedure at periodic intervals, and as a minimum after each adjustment of the optical path, but this involves a break in production. Changes in position of the laser beam due to thermal effects in the beam generation and guidance system remain wholly uncompensated. The result is a reduction in the precision of the welding operation.

Theoretically these problems could be solved by incorporating a beam position sensing system into the beam guidance system already present as part of the beam detecting system. However, such sensing systems are usually unsuitable for on-line operation and, at the very least, their use is likely to incur considerable additional cost.

Furthermore it is known that a welded seam can be monitored behind the beam. However, this is done not in order to take account of the position of the joint line, but merely to determine the quality of the welded seam.

SUMMARY OF THE INVENTION

An object which underlies the present invention is to provide a method and an apparatus of the kind referred to above by means of which a beam or jet, in particular a laser beam, may be continuously monitored and positioned and corrected to a basic position.

This object can be achieved by comparing the preset values, or the readings obtained by the first sensor regarding a required position of the beam or jet, with readings obtained by the second sensor regarding an actual position of the beam or jet, taking account of the velocity-dependent relative displacement between the beam or jet and the workpiece, and by correcting the beam or jet to a basic position if the actual position deviates from the required position.

This means that the track of a seam, in particular of a welded seam, behind the beam, is determined by the second sensor, and compared with the track, or with a required track, ahead of the beam. Preferably this is combined with quality inspection of the welded seam itself.

This system according to the invention is not restricted to the production of a welded joint between two workpieces, or to the particular case of laser welding described here, and it may be applied in all processes using path-guided beams or jets. First of all among such processes are cutting processes using high-energy radiation.

The solution of the problem can be arrived at primarily by generating a reference system of coordinates in relation to an image-processing system for detecting the position of the joint line. A second image-processing system can be related to this reference system of coordinates, provided the image-generating sensing systems are fixed relative to a common rigid mounting surface and are calibrated to each other.

Because in many situations, such as in a laser welding unit, a second sensor system located immediately behind the welding position is needed anyway in order to perform an automatic inspection of the geometry of the seam produced, the cost of this second sensor system is extremely low. The requirements for optical image recording and also the scanning rate of the second sensor system are similar to those of the first system for detecting the joint line, so that an almost identical construction can easily be employed.

Thus, while the position of the seam to be welded is continuously computed by the first image-processing system, the subsequent image-processing system characterises the seam which has just been welded, also in respect of its position within the common reference system of coordinates. In order to obtain a superimposition of images that is accurate and complete, since the two sensing heads have a fixed common mounting, it is necessary only to know the velocity-dependent displacement time required by either the workpieces or the beam to move eg. from the coordinate origin of the image field of the first sensor to the corresponding location in the image field of the second sensor. This displacement time can easily be recorded with commercially available measurement systems, and can form the basis for the alignment of the images to be superimposed. If the rate of feed of the components for welding or cutting is known, a precise correspondence between the actual track and the required track can be obtained.

Using the superimposition of images which has been described, the point of impingement of the focussed laser beam with respect to the actual position of the joint line can be determined with pinpoint accuracy by the image analysing programme. Once this reference value is known, it becomes possible firstly to make a direct inference of the probability of internal lack of fusion occurring, based on the known values for focus diameter and seam width. Furthermore, as the drift in the beam position due to thermal causes is relatively gradual, corrections to the beam position can easily be made.

Of course, the present invention is not limited to a one-dimensional feed. It is also feasible for a beam or jet to be monitored and positioned in a similar manner with two-or three-dimensional feed.

A large number of techniques for detecting the track of a joint line and/or weld seam are known from the state of the art. All these techniques can be used in conjunction with the present invention. Examples which should be mentioned are the light section technique and the technique using grey-level image analysis. A description of the light section technique may be found for example in DE-OS 4312241, while a description of the detection of joint geometry by grey-level image analysis can be found in *DVS-Berichte*, Volume 94 (1985), pages 44ff.

Depending on circumstances, the two sensors may operate by the same technique or by different techniques. Experience will show what qualitative requirements should be imposed on the individual techniques. Where the method according to the invention is to be used for cutting by means of a beam or jet, the sensor ahead of the beam or jet can be dispensed with, in most cases. The function of the sensor in determining the required position, and also in guiding the beam or jet accordingly, is then assumed by preset values which may be stored in an electronic memory.

BRIEF DESCRIPTION OF THE DRAWINGS

Further advantages, features and details of the invention will become apparent from the following description of preferred embodiments, and with reference to the drawing, in which.

DESCRIPTION OF THE PREFERRED EMBODIMENTS

Figure 1:
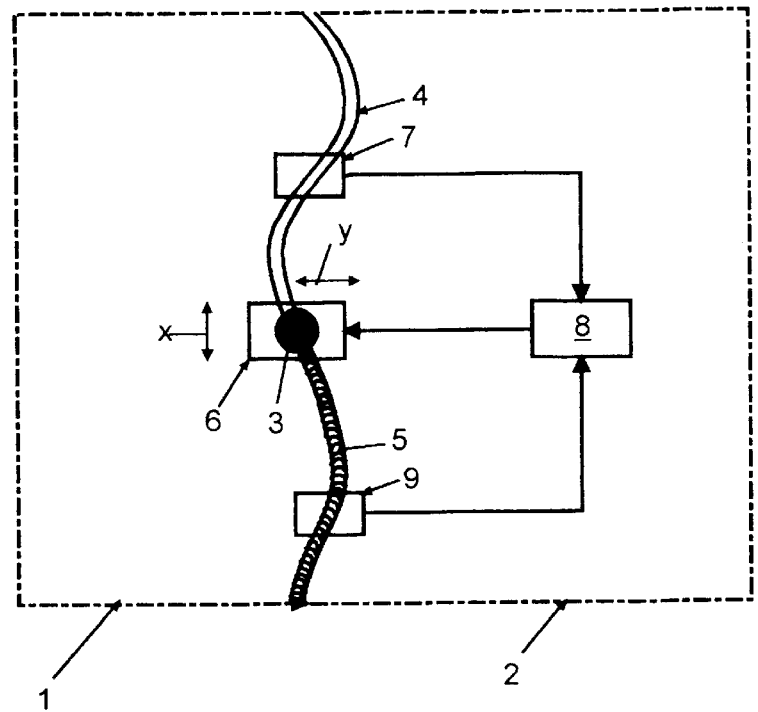
FIG. 1 shows a plan view, partly in block diagram form, of an apparatus for monitoring and positioning a beam for operating on workpieces.

As shown in FIG. 1, two workpieces 1 and 2 are to be joined together by a beam 3. The region of the joint between the two workpieces 1 and 2 ahead of the beam 3 is referred to as the joint line 4, and the same region behind the beam 3 as the welded seam 5.

The beam 3 comes from a source (not shown) on a displacement device 6, which may for example consist of a cross slide. In this instance the displacement device 6 is movable in two dimensions x and y. However, it would also be possible to provide three-dimensional movement. The only essential point is that the displacement device 6 allows the beam 3 to be guided along the joint line 4 and to be aligned with the latter.

In order that the beam 3 can be guided along the joint line 4, a sensor 7 (also called a seam detecting system) is provided ahead of the beam 3. This sensor 7 is coupled to a control unit 8 and continuously detects the track of the joint line 4. On the basis of the velocity-dependent displacement time of the workpieces—or the displacement time of the beam if it is traversed with respect to the workpieces—the course of the joint line 4 is determined by the control unit 8 which sets in motion the displacement device 6 in accordance with the readings obtained by the sensor 7, so that the beam 3 is always aimed precisely at the joint line 4, and preferably at a centreline (not shown) of the joint line 4.

In accordance with the invention, a further sensor 9 is provided behind the beam 3, and is also connected to the control unit 8. This second sensor observes the welded seam 5.

The mode of operation of the apparatus in accordance with the present invention will now be described with reference to FIG. 2, by way of example.

The sensor 7 which precedes the beam 3 operates by the so-called light section technique. This involves the projection on to the region of the joint line 4, at an oblique angle to the optical axis of the sensor lens system, of a pattern of strips, consisting in the present case of five parallel strips 10. These strips 10 extend essentially across the line of the joint to be welded, but could also be located differently. In the region of the joint line 4, the strips are interrupted, or shifts occur which are detected by the sensor. The track of the joint lines can then be determined from a number of points corresponding to the number of strips.

Figure 2:
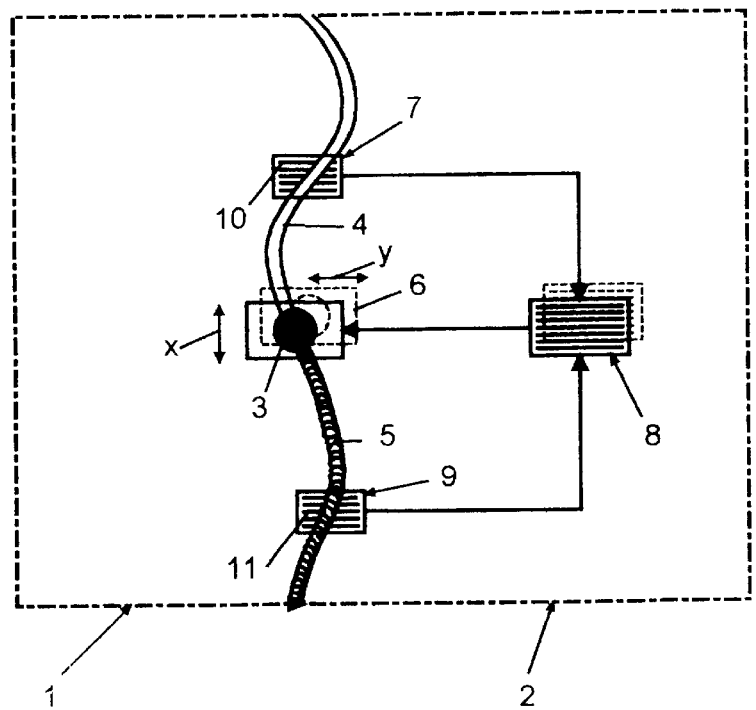
FIG. 2 shows a plan view of the apparatus of FIG. 1 with the beam position detection depicted diagrammatically.

As illustrated in FIG. 2, the second sensor 9 operates on the same principle, and the welded seam 5 is illuminated with a similar strip pattern 11.

If, in the course of time, for example as a result of thermally induced drift, the beam 3 deviates from its position shown in unbroken outline to a position indicated in broken outline, this cannot be detected by the sensor 7, which always presupposes that the beam 3 is in its basic position. However, the following sensor 9 does detect a deviation of the track of the welded seam 5 from the track of the sensor 7, as the readings fed to the control unit 8, consisting for example of position coordinates obtained by image analysis, no longer coincide. This is also indicated schematically in the drawing in broken lines. The displacement device is then shifted by means of the control unit 8 in accordance with the correction value obtained, restoring the beam 3 to the basic position.

We claim:

1. Method for monitoring and positioning a beam or jet for operating on a workpiece, in which at least one of a first sensor ahead of the beam or jet and preset values, determines the path to be followed by the beam or jet and a second sensor behind the beam or jet monitors the action of the beam or jet, characterised in that the preset value or the readings obtained by the first sensor regarding a required position of the beam or jet is or are compared with readings obtained by the second sensor regarding an actual position of the beam or jet taking account of the velocity-dependent relative displacement between the beam or jet and the workpiece, and the beam or jet is corrected to a basic position if the actual position deviates from the required position.

2. Method for monitoring and positioning a beam or jet for operating on a workpiece according to claim 1, characterised in that the required position of the beam or jet is detected by a light section technique or a combination of light section and grey-level image analysis techniques and the actual position of the beam or jet is detected by a grey-level image analysis technique or a combination of light section and grey-level image analysis techniques and said detected positions are compared with one another.

3. Apparatus for monitoring and positioning a beam or jet for operating on a workpiece, in which at least one of a first sensor ahead of the beam or jet and preset values, determines the path to be followed by the beam or jet and a second sensor behind the beam or jet monitors the action of the beam or jet, characterised in that the first and second sensors are connected to a control unit for comparing the readings obtained by the two sensors, the control unit being connected to a displacement device for relative displacement between the beam or jet and the workpiece.

* * * * *